(12) United States Patent
Adamek et al.

(10) Patent No.: US 7,311,747 B2
(45) Date of Patent: Dec. 25, 2007

(54) FILTER ASSEMBLY WITH PLEATED MEDIA V-PACKS, AND METHODS

(75) Inventors: Daniel Eric Adamek, Bloomington, MN (US); Michael Jon Gustafson, St. Bonifacius, MN (US); Jarren B. Mills, Apple Valley, MN (US); Kirk A. Schnieder, Eden Prairie, MN (US); Marilyn D. Welch, Burnsville, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 422 days.

(21) Appl. No.: 10/965,684

(22) Filed: Oct. 14, 2004

(65) Prior Publication Data

US 2005/0144916 A1 Jul. 7, 2005

Related U.S. Application Data

(60) Provisional application No. 60/511,264, filed on Oct. 14, 2003.

(51) Int. Cl.
*B01D 46/00* (2006.01)
(52) U.S. Cl. .............................. 55/498; 55/510; 55/521
(58) Field of Classification Search .................. 55/484, 55/486, 488, 489, 492, 498, 500, 510, 521, 55/524, 529
See application file for complete search history.

(56) References Cited

U.S. PATENT DOCUMENTS

| | | | |
|---|---|---|---|
| 3,448,862 A * | 6/1969 | Kudlaty | 210/489 |
| 4,154,688 A * | 5/1979 | Pall | 210/487 |
| 4,640,779 A * | 2/1987 | Taki et al. | 210/493.5 |
| 4,655,921 A | 4/1987 | Fujimoto | |
| 4,673,503 A | 6/1987 | Fujimoto | |
| 4,738,778 A * | 4/1988 | Taki et al. | 210/493.1 |
| 4,746,432 A * | 5/1988 | Taki et al. | 210/493.5 |
| 5,043,000 A | 8/1991 | Kadoya | |
| 5,071,555 A * | 12/1991 | Enbom | 210/493.5 |
| 5,120,296 A | 6/1992 | Yamaguchi et al. | |
| 5,236,480 A | 8/1993 | Svensson et al. | |
| 5,306,321 A * | 4/1994 | Osendorf | 55/487 |
| 5,320,657 A | 6/1994 | Adams | |
| 5,427,597 A * | 6/1995 | Osendorf | 55/487 |
| 5,512,076 A * | 4/1996 | Gibson | 55/498 |
| 6,312,489 B1 | 11/2001 | Ernst et al. | |
| 6,409,785 B1 * | 6/2002 | Smithies et al. | 55/486 |
| 6,585,793 B2 | 7/2003 | Richerson et al. | |
| 6,598,749 B2 | 7/2003 | Paul et al. | |
| 6,602,328 B2 * | 8/2003 | Doi et al. | 95/278 |

(Continued)

FOREIGN PATENT DOCUMENTS

DE 1 204 629 11/1965

*Primary Examiner*—Duane Smith
*Assistant Examiner*—Robert A Clemente
(74) *Attorney, Agent, or Firm*—Merchant & Gould P.C.

(57) ABSTRACT

A generally cylindrical filter element incorporating nonsymmetrical or asymmetrical V-pleated media. The V-pleated media provides increased filter media per given filter volume, extended filter life, and a smaller filter for equivalent filter life. A smaller filter is generally beneficial for some applications such as aircraft, due to its lower weight. Various features of the filter include asymmetric variable pleat heights applied to a cylindrical or obround filter; defined pleat spacing applied to a variable pleat height element; optimal pleat density; and optimal shape of inlet and outlet.

18 Claims, 7 Drawing Sheets

U.S. PATENT DOCUMENTS 6,709,495 B1 * 3/2004 Storer ........................... 96/58
2002/0083836 A1 * 7/2002 Doi et al. ..................... 95/278
2003/0110130 A1 6/2003 Pelletier
2005/0139544 A1 * 6/2005 Choi ....................... 210/493.1

* cited by examiner

FILTER ASSEMBLY WITH PLEATED MEDIA V-PACKS, AND METHODS

This application claims priority under 35 U.S.C. § 119(e) to provisional application Ser. No. 60/511,264, filed Oct. 14, 2003. The complete disclosure of application Ser. No. 60/511,264 is incorporated by reference herein.

FIELD

The present invention relates to pleated filter media for use in fluid filters. In particular, the invention relates to pleated filter media for use in cylindrical and obround fluid filters.

BACKGROUND

Panel air filters having a multiple V-pleat configuration are commercially available from various sources such as Donaldson Company, Inc., Pall Corp., TriDim Filter Corp., and Koch Filter Corp. A partial section of a multiple V-pleat panel, having a constant pleat height, is shown in FIG. 1. Multiple V-pleat panel configurations are known to greatly improve performance in a panel filter having an axial flow configuration.

It is well established in the filter industry that by decreasing pleat height and increasing pleat density, additional media surface area can be packaged into a given volume, thereby lowering face velocity, which is a function of media surface area. Such is the basis for multiple V-pleat panel filters. However, in some applications, a panel filter is not desirable. For example, when air is drawn from a large plenum into an outlet duct, a cylindrical, radial flow filter is the preferred configuration, in order to increase filter media surface area.

Previously, there have been no known attempts to use a constant pleat height multiple—V-pleat configuration in a cylindrical arrangement. The disadvantages associated with such a design would prevent those skilled in the art of filters from attempting such a design. The disadvantages include a decrease in the amount of media that can be packaged within a given volume, and an increase in pressure loss that results from both the higher flow velocities across the media face and the additional inlet and outlet losses at the "V's".

A commercially available oil filter, produced for Toyota by Nippondenso, incorporates variable pleat height with multiple V-pleats in a cylindrical configuration. This design is also shown in FIG. 17 of U.S. Pat. No. 4,746,432, assigned to Nippondenso. The general filter media configuration of FIG. 17 of the '432 patent is reproduced as FIG. 2 of this application.

Another variable pleat height construction has pleats that have one common edge along a line that is perpendicular to the pleats. An example of this has been found on an Internet web site, and is typical of a panel filter element that can be produced on a programmable pleater, such as available from Rabofsky Company. An example of this can be found at "http://www.alps-filter.co.jp/alps-e/preets.htm" and is shown in FIG. 3.

As mentioned above, there have been no known attempts to use a constant pleat height multiple V-pleat configuration in a cylindrical arrangement. A schematic diagram of a cylindrical arrangement of a constant pleat height multiple V-pleat filter is shown in FIG. 4, with the individual pleats omitted. Because the outer circumference of the filter is greater than the inner circumference, the outer "V" angle is much greater than the inner "V" angle when a constant pleat height is used. This results in a large space penalty for this configuration.

A better cylindrical filter design is needed.

SUMMARY OF THE DISCLOSURE

The present disclosure is directed to cylindrical and obround fluid filters having pleated media V-packs with asymmetric V-portions or V-halves. As described above in the Background, constant height pleated V-packs have been known for use in panel air filters (see FIG. 1). It has been found that by adopting the benefits of a V-pack from a panel filter to a cylindrical arrangement, variable pleat heights can be used. The Nippondenso patent, mentioned above, suggests using symmetrical variable pleat heights, but merely suggests it for strength and size reasons. FIG. 17 of the '432 patent (see FIG. 2), and the entire patent specification, discloses multiple V-pack portions that are symmetric about a longitudinal axis of each V-pack and about a longitudinal axis of each portion or half of each V-pack. That is, a line through the center of each V-pack runs generally perpendicular to the pleats; similarly, a line through the center of each V-pack half runs perpendicular to the pleats.

Although the Nippondenso '432 patent illustrated using variable height V-packs for a cylindrical filter, the "V's" are symmetrical, and many pertinent details needed to obtain a suitable and usable filter element are missing from the teachings of the '432 patent. For example, there is no definition of the preferred slope of the pleat height, no definition of the optimal pleat density or separation, no definition of the type of media used, no definition of any pleat spacing method, and no definition of inlet "V" angle or outlet "V" angle.

Improvements are needed, and are provided by Applicants' design. Applicants have provided a filter incorporating nonsymmetrical or asymmetrical V-pack portions in a circular and obround (including oval, elliptical, racetrack, and other similar non-circular) fluid filter, which provides increased filter media per given filter volume, extended filter life, and a smaller filter for equivalent filter life. A smaller filter is generally beneficial for some applications such as aircraft, at least due to its lower weight.

Various features of the filter include asymmetric variable pleat heights applied to a cylindrical or obround filter; defined pleat spacing applied to a variable pleat height element; optimal pleat density; and optimal shape of the inlet and outlet.

In one particular embodiment, a cylindrical or obround filter element is disclosed, the filter having an extension of filter media configured and arranged in a plurality of media V-packs. Each media V-pack has a first portion and a second portion, each of the first portion and the second portion having an external edge, an outermost edge, an internal edge and an innermost edge. The external edges of the first and second portions are joined at an angle of about 4 to 26 degrees. The outermost edge of each portion is longer than the innermost edge of the respective portion. Further, each of the first and second portions has a plurality of media pleats extending generally parallel to the outermost edge of the section and preferably perpendicular to the external edge of the portion. The pleats may extend at an angle of about 2 to 13 degrees from perpendicular to the internal edge of the section. The pleats may extend generally parallel to the innermost edge of the portion.

A pleat density of 8 to 15 pleats per inch is suitable. A pleat spacing mechanism, such as beads of hot melt, is included to maintain the pleat density. Such pleat spacing mechanisms are generally spaced no more than 1.5 inches apart.

In another particular embodiment, a cylindrical or obround filter element is disclosed, the filter having an extension of pleated filter media configured and arranged in a plurality of media portions. Each media portion has an external edge, an outermost edge, an internal edge and an innermost edge. The external edges of adjacent portions are joined together at an angle of about 4 to 26 degrees and the internal edges of adjacent sections are joined together at an angle of about 4 to 26 degrees. The outermost edge is longer than the innermost edge. The internal edges and innermost edges define an inner perimeter and the external edges and outermost edges define an outer perimeter of the filter media extension.

Depending on the desired use of the filter element, the angle formed by the external edges of adjacent portions can be greater than the angle formed by the internal edges of adjacent section, or the angle formed by the external edges of adjacent portions can be less than the angle formed by the internal edges of adjacent section. In some embodiments, the inlet or upstream angle is greater than the outlet or downstream angle.

Filter elements according to the present disclosure are particularly suitable for aircraft cabin applications, which desire high unit area filtration, large air flow, and low filter weight. In one particular embodiment, a method of cleaning air for an aircraft cabin is disclosed. The method comprises providing a filter element, passing dirty air through the filter media from an inlet side of the filter media to an outlet side of the filter media; and obtaining cleaned air. The filter element includes an extension of filter media configured and arranged in a plurality of media portions. Each media portion has four edges, with the external edges of adjacent portions joined together at an angle of about 4 to 26 degrees and the internal edges of adjacent portions joined together at an angle of about 4 to 26 degrees. The outermost edge is longer than the innermost edge. The internal edges and innermost edges of the plurality of media portions define an inner perimeter of the filter element and the external edges and outermost edges of the plurality of media portions define an outer perimeter of the filter element. Each media portion has a plurality of pleats extending parallel to the outermost edge and preferably generally perpendicular to the external edge.

For standard, out-to-in, flow, the inlet side of the filter media is defined by the outer perimeter and the outlet side is defined by the inner perimeter. For aircraft cabin applications, with standard flow, it is preferred that the angle formed by the external edges of adjacent portions is greater than the angle formed by the internal edges of adjacent portion.

For reverse, in-to-out, flow, the inlet side of the filter media is defined by the inner perimeter and the outlet side is defined by the outer perimeter. For aircraft cabin applications, with reverse flow, it is preferred that the angle formed by the external edges of adjacent portions is less than the angle formed by the internal edges of adjacent portion.

Various other features of the filter elements and methods of using the elements are described below.

BRIEF DESCRIPTION OF THE DRAWINGS

Referring now to the drawings, wherein like reference numerals and letters indicate corresponding structure throughout the several views.

DETAILED DESCRIPTION

The present invention is directed to a cylindrical fluid filter element, suitable for use with both gases and liquids. The filter element includes pleated filter media, circularly arranged as "V-packs" or "V-sections", each of the "V's" having two halves or portions. By use of the term "V", what is intended is two sections or portions of media, each portion comprising a plurality or multiplicity of folds or pleats. The two portions meet or are joined to form a media construction having a generally "V" shape. A single "V-portion" is illustrated in FIG. 3, and a "V-pack" or "V-section" is illustrated in FIG. 5.

Figure 1:
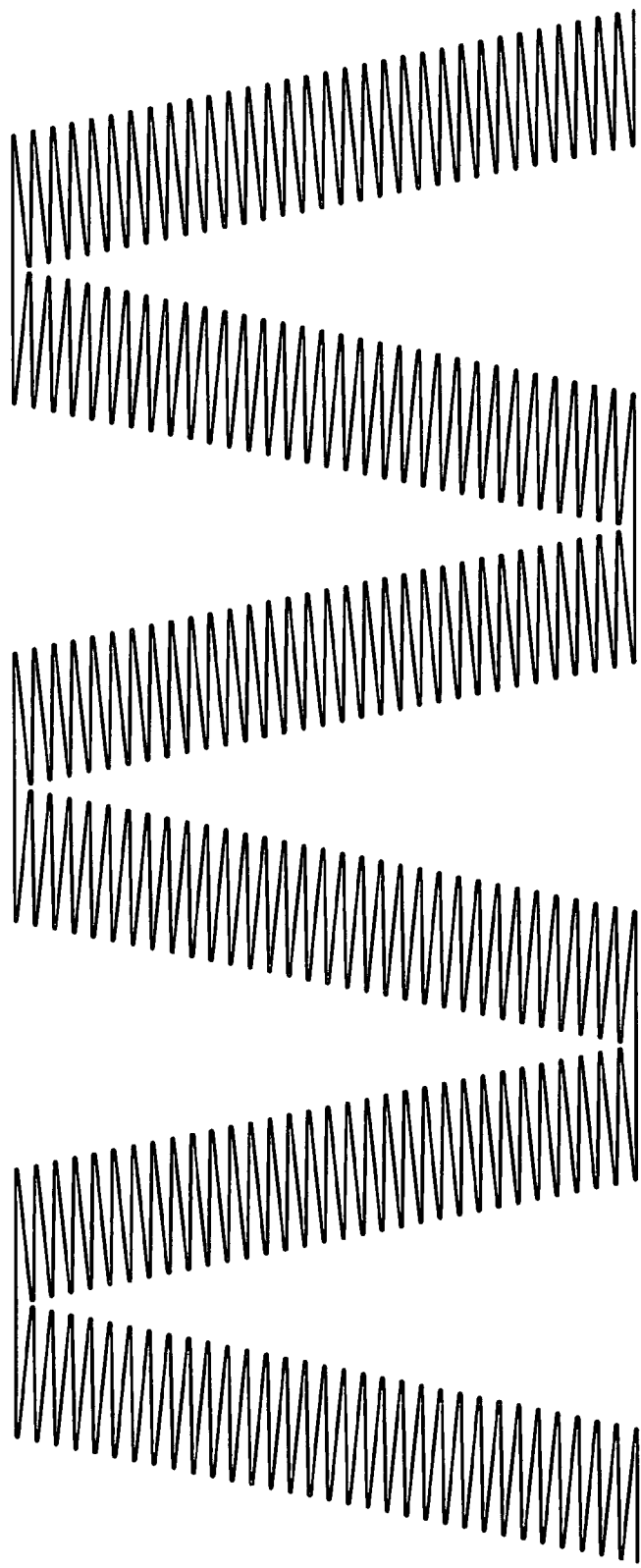
FIG. 1 is a photographic front view showing a prior art panel filter element having constant height pleated V-packs.
Figure 2:
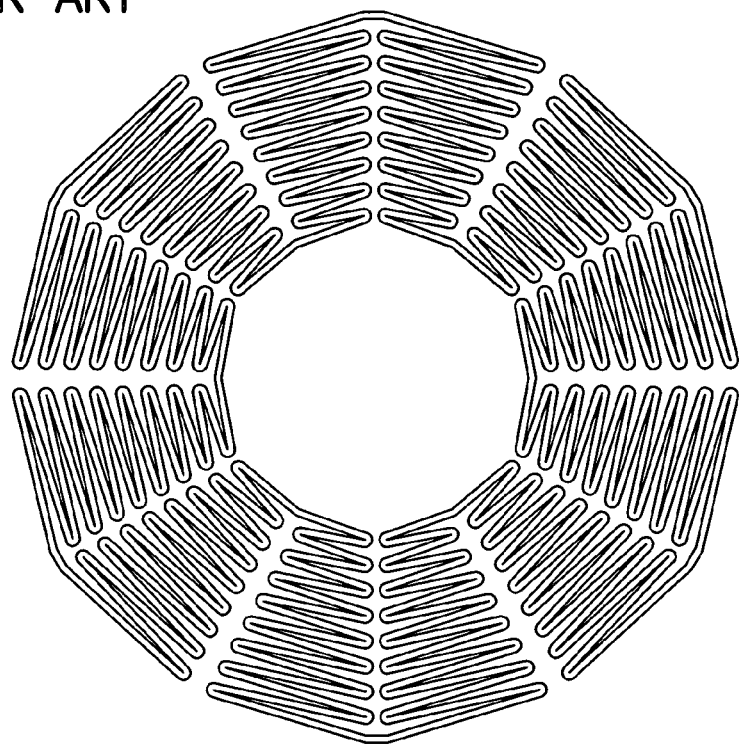
FIG. 2 is a schematic top plan view of a prior art cylindrical filter element having variable height pleated V-packs.

The two portions of the "V" are symmetrical and are mirror images of one another. By use of the term "symmetrical", what is intended is that if a central line were drawn through the center of the "V-pack" toward the center point of the filter element, one portion would be on each side of the central line, and each of the portion s would be a mirror image of the other. For a "symmetrical V-portion, an axial line drawn from the center of a cylindrical filter element would pass through the center of the V-portion, and, each of the halves of the V-portion would be the same. Examples of symmetrical V-portion s are provided in FIGS. 2 and 4. Preferably, however, in accordance with the present invention, the two portions or halves that form the "V-pack" are asymmetrical. By use of the phrase "the portion is asymmetrical", and variations thereof, what is meant is that if a central line were drawn from the center of the filter through the center of the outer edge of the portion, the two sides of the portion are not symmetrical and are not mirror images. An example of an asymmetrical pleated media portion having multiple height pleats that has one common edge along a line that is perpendicular to the pleats is shown in FIG. 3. As stated above, in a preferred embodiment according to the invention, the two portion s or halves of the "V" are symmetrical and are mirror images of each other, and each is a half of the total "V".

Figure 3:
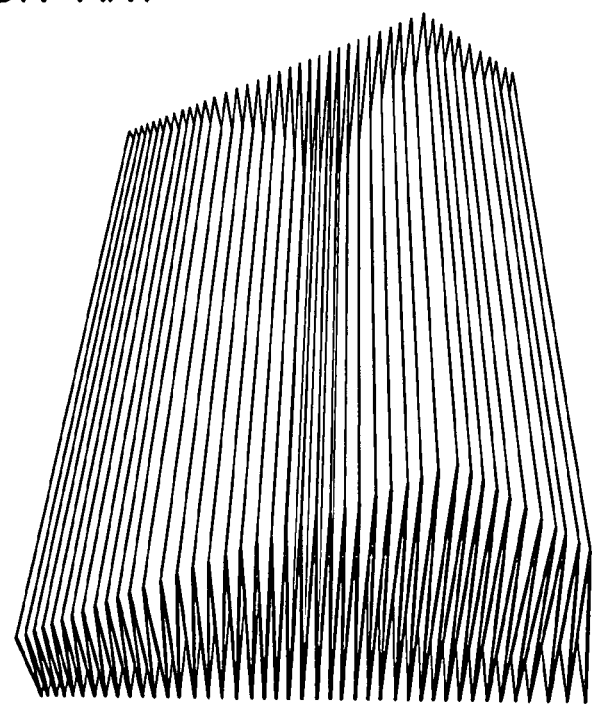
FIG. 3 is a photographic perspective view of prior art pleated media, in particular, having multiple height pleats that have one common edge along a line that is perpendicular to the pleats.
Figure 4:
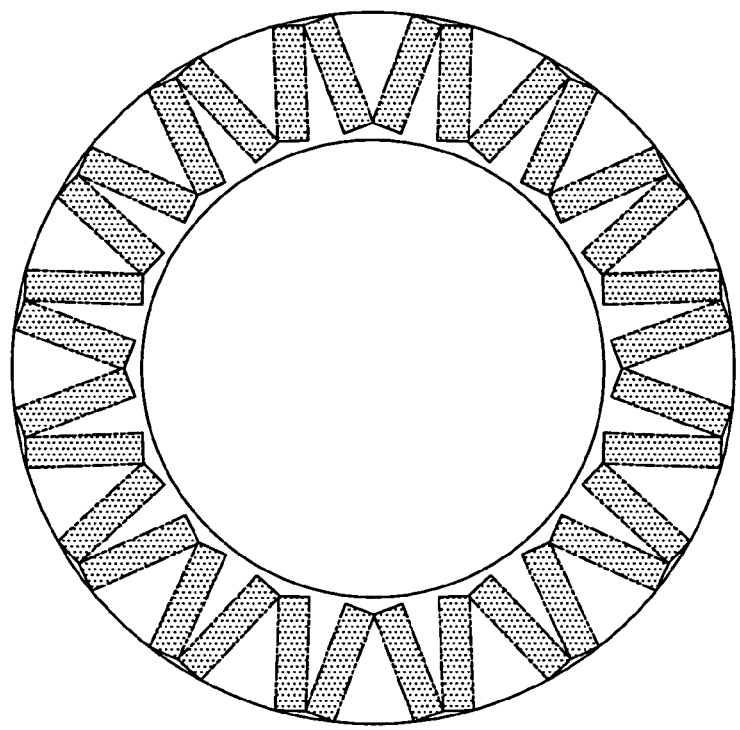
FIG. 4 is a schematic diagram of a top plan view of a cylindrical filter element having constant height pleated V-packs.
Figure 5:
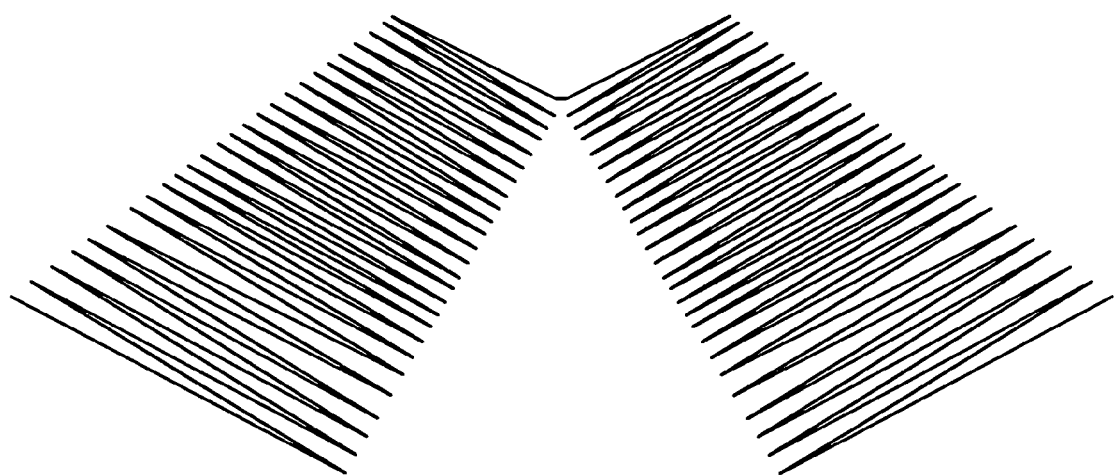
FIG. 5 is a schematic diagram of a top plan view of a V-pack of pleated media made from two sections of the media illustrated in FIG. 3, having multiple height pleats that have one common edge along a line that is perpendicular to the pleats.

Assembling two of the asymmetrical pleated media portions of FIG. 3 provides the "V"-configuration shown in FIG. 5. The pleat common edge of the two media portions forms the inner edges of the "V", which defines a "V" that opens to the exterior of the filter element. This configuration, when applied as later discussed, has some space utilization benefits that a symmetric variable pleat V configuration does not.

Figure 6:
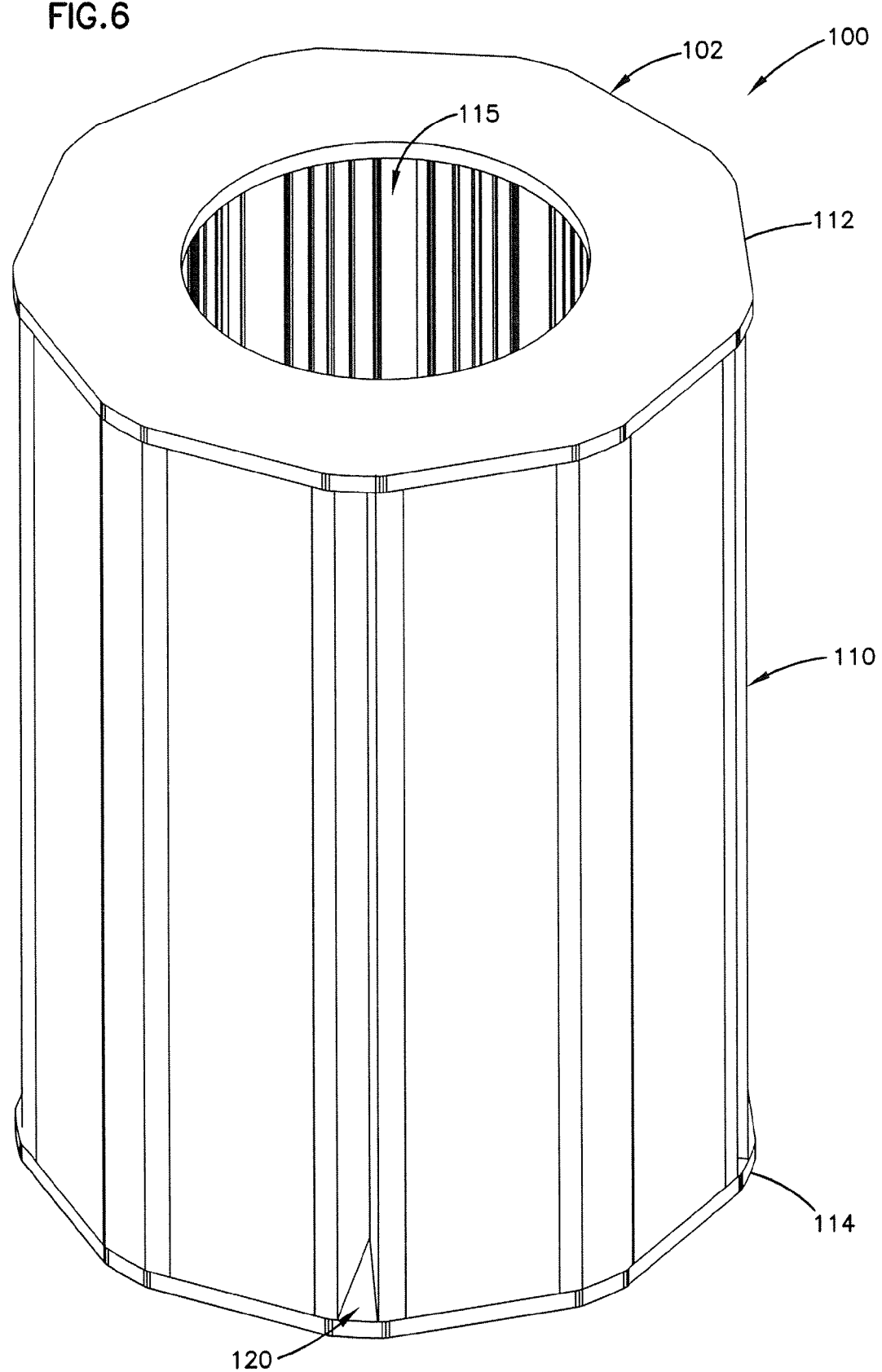
FIG. 6 is a schematic perspective view of a filter element according to the present invention.
Figure 7:
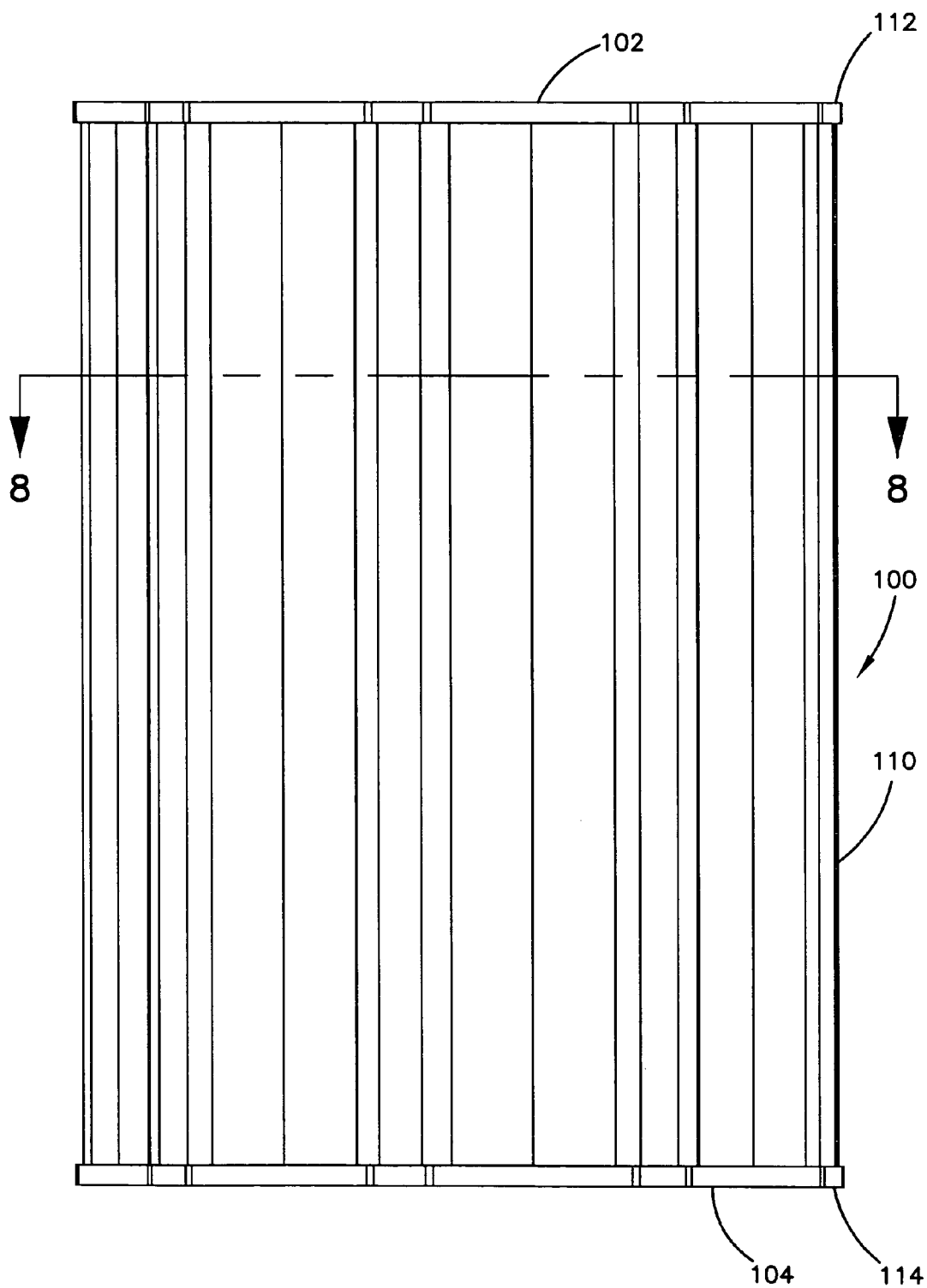
FIG. 7 is a side view of the filter element of FIG. 6.
Figure 8:
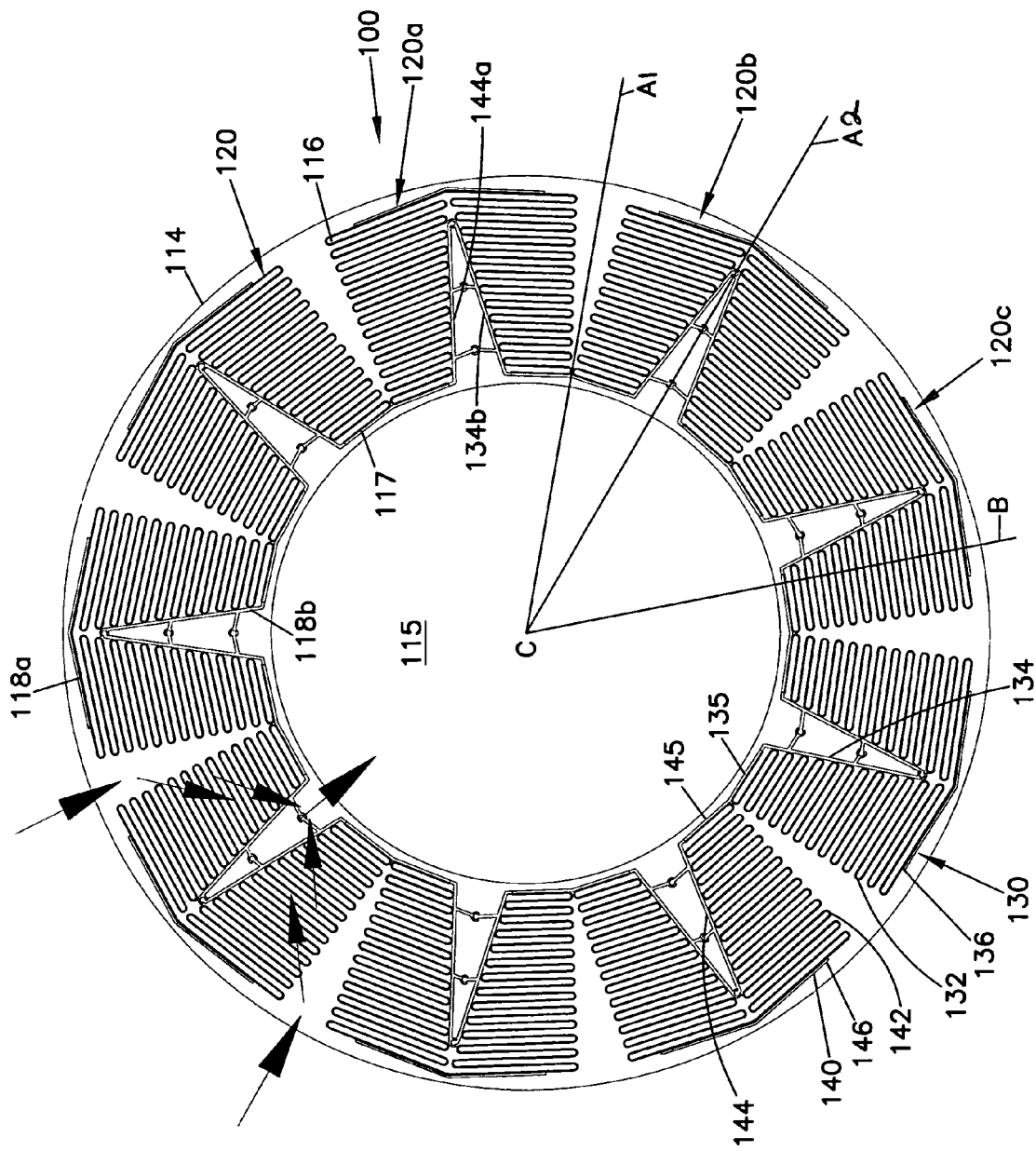
FIG. 8 is a cross-sectional view taken along line 8-8 of FIG. 7.

Referring now to the Figures, an embodiment of a filter element according to the present invention is illustrated in FIGS. 6-8. Referring specifically to FIGS. 6 and 7, a filter element 100 is shown having a first end 102 and an opposite end 104. A generally cylindrical extension of pleated filter media 110 extends from first end 102 to second end 104. Pleated filter media 110 is preferably and typically potted in first end cap 112 at first end 102 and in second end cap 114 at second end 104. Generally, one of end cap 112, 114 is an "open" end cap and the other is a "closed" end cap. Referring specifically to FIG. 8, pleated filter media 110 has an outer perimeter surface 116 and an inner perimeter surface 117. Inner perimeter surface 117 defines an interior 115 of filter 100.

As illustrated in FIGS. 6 and 8, but best seen in FIG. 8, pleated filter media 110 has a plurality of pleated V-packs 120. In FIG. 8, various V-packs 120 are designated as V-pack 120a, V-pack 120b, and V-pack 120c. Each V-pack 120 has a first portion, a first half or first V-portion 130 and a second portion, second half or second V-portion 140. Portions 130, 140 are generally symmetrical about a central axis A1 that extends to a center point C of filter element 100. Portions 130, 140 are joined and angled to provide the "V". V-pack 120 is positioned so that the open end of the "V" is proximate outer perimeter 116 and the narrow or point end of the "V" is proximate inner perimeter 117 and interior 115.

Figure 9:
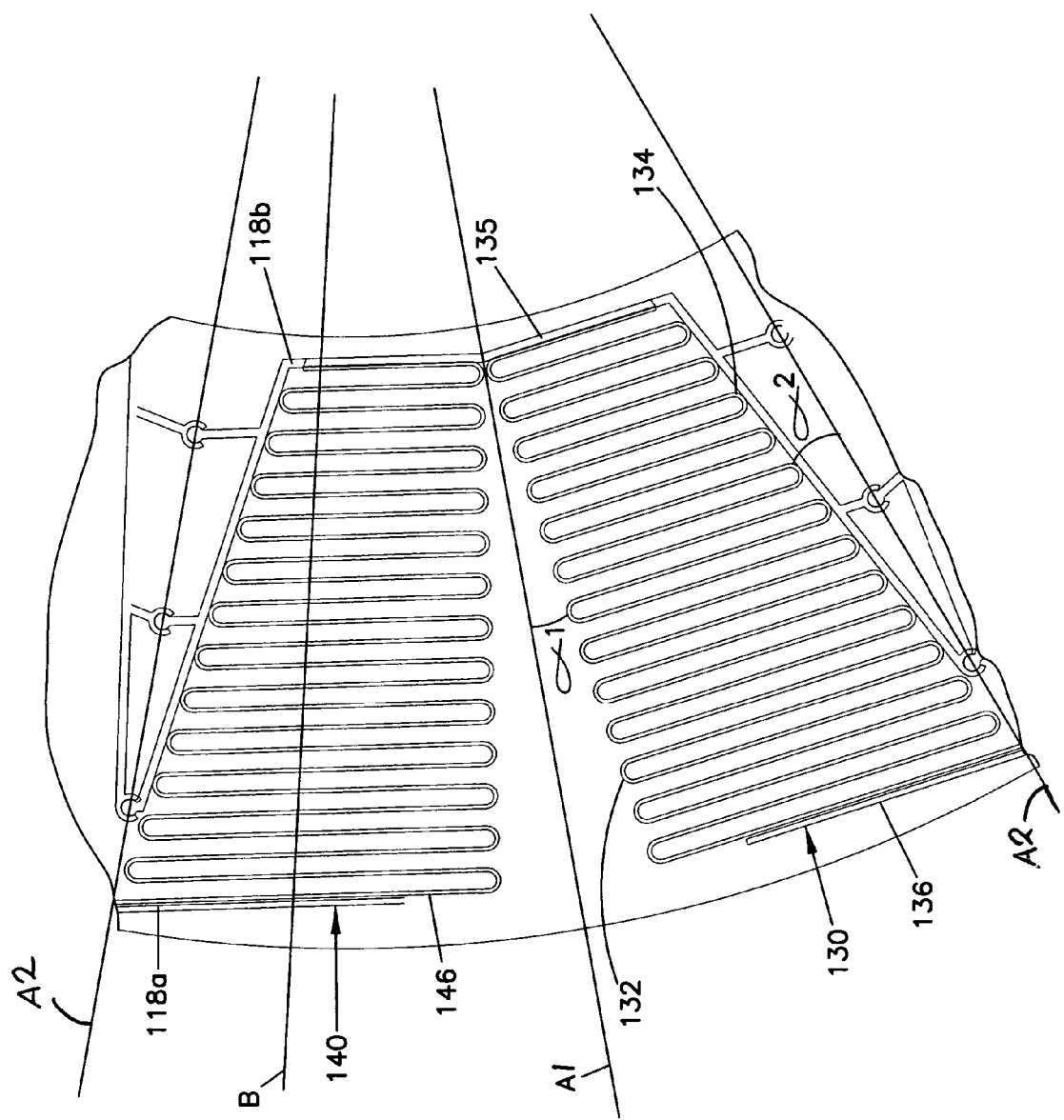
FIG. 9 is an enlarged, schematic top view of a portion of the cross-sectional view of FIG. 8.

The edges of first V-portion 130 are defined by a first edge 132, an opposite second edge 134, a third edge 135, and a fourth edge 136. These various edges are also shown in FIG. 9. Similarly, the edges of second V-portion 140 are defined by a first edge 142, an opposite second edge 144, a third edge 145, and a fourth edge 146.

First edges 132, 142 can also be referred to as outer edges, exterior edges or the like, as they define the edges of the "V"-portion of V-pack 120 that is positioned farther from interior 115 than second edges 134, 144. Additionally, first edges 132, 142 define a portion of media outer perimeter 116. Second edges 134, 144 can also be referred to as interior edges, internal edges, or the like, as they define the edges of the "V"-portion of V-pack 120 that is closer to interior 115 than first edges 132, 134. Additionally, second edges 134, 144 partially define inner perimeter 117 and interior 115. The distance between external edges 132, 142 is less than the distance between internal edges 134, 144. None of external edges 132, 142 or internal edges 134, 144 extends radially toward filter center C.

Third edges 135, 145 form the innermost portion of portions 130, 140 of V-pack 120. By use of the term "innermost portion", what is intended is that third edges 135, 145 are the portion of V-pack 120 closest to interior 115 of filter 100. Additionally, together with internal edges 134, 144, third edges 135, 145 define inner perimeter 117 and interior 115. Fourth edges 136, 146 form the outermost portion of portions 130, 140 of V-pack 120. Together with external edges 132, 142, edges 136, 146 define outer perimeter 116.

Sections or portions 130, 140 form the V-shaped structure from which V-pack 120 gets its name. External edges 132, 142 meet to form an angle, positioning portions 130, 140 to form the "V" shape. As stated above, the media-V is positioned such that the angle point is at inner perimeter 117 toward interior 115 and the wide end opening is toward filter outer perimeter 116. The angle formed between external edge 132 and external edge 142 is typically about 4 to 26 degrees, and preferably about 6 to 24 degrees. The angle formed between either external edge 132 or external edge 142 and central axis A1 would be half of the angle between edges 132, 142, typically about 2 to 13 degrees and preferably about 3 to 12 degrees. The angle formed between internal edge 134 and internal edge 144 is generally within the same range as that between external edges 132, 142, and the angle formed between either internal edge 134 and internal edge 144 and axis A2 is also generally within the same range.

Additional details regarding this angle are provided below with the discussion of FIG. 9. Internal edges 134, 144 of V-pack 120 do not meet; rather, internal edge 144a from V-pack 120a meets internal edge 134b from V-pack 120b (see FIG. 8) and forms an angle therewith.

External edges 132, 142 join outermost edges 136, 146, respectively, at approximately a right angle. Additional discussion regarding this angle is provided below.

Fluid to be filtered by filter element 100 flows through media 110, either in an out-to-in direction, as indicated by the arrows in FIG. 8, or in an in-to-out direction, which is commonly referred to as "reverse flow". For an out-to-in flow, external edges 132, 142 are the inlet or upstream side of media 110 and internal edges 134, 144 are the outlet or downstream side of media 110. For reverse flow, internal edges 134, 144 are the inlet or upstream side of media 110 and external edges 133, 143 are the outlet or downstream side.

Filter element 110 may include supporting structures to improve the rigidity of V-packs 120. A support structure may be present to support V-packs 120 and inhibit their collapse, particularly on the outlet or downstream side. Referring to FIG. 8, where out-to-in flow is indicated, outer support 118a supports outer perimeter 116 and an inner support 118b support inner perimeter 117 and provides support to internal edges 134, 144 to inhibit the angle between portions 130, 140 from collapsing. It is understood that in a filter configured for in-to-out flow, outer supports 118a would be configured to inhibit the outlet angle from collapsing. Although not desired, supports 118a and 118b may limit flow through ends 136, 146, and 135, 146 respectively, due to their structure.

Asymmetric Pleated Media

Referring also now to FIG. 9, a pleat V-pack according to the present invention is illustrated, showing first V-portion 130 and second V-portion 140. Central axis Al of V-pack 120 is also shown between V-portion 130 and V-portion 140; axes A2 are shown on the sides of portions 130, 140. As can be seen in FIG. 9, each portion 130, 140 is asymmetrical. An axis B, from filter center C to the center of outermost edge 136, 146 does not create two equal sides or two mirror images.

Each portion 130, 140 is composed of a plurality of folds or pleats in the media. The pleats extend generally parallel to outermost edges 136, 146. By use of the term "generally parallel", what is intended is no more than 10 degrees from parallel. Preferably, and additionally or alternatively, the pleats extend generally perpendicular to external edges 132, 142. By use of the term "generally perpendicular", what is intended is no more than 10 degrees from perpendicular; that is, the angle between the pleats and edges 132, 142 is 80 to 100 degrees, preferably 85 to 95 degrees. The pleats are not perpendicular to internal edges 134, 144, but rather, form an angle of about 77 to 84 degrees in relation to edges 134, 144. When the pleats are perpendicular to edges 132, 142 (at 90 degrees) and parallel to edges 136, 146 (at 0 degrees), a right angle (i.e., 90 degrees) is present between external edges 132, 142 and outermost edges 136, 146. The length of the pleats (measured from edge 132 to edge 134) is greater at outermost edge 136 than at innermost edge 135.

It is understood that in some embodiments, portions 130, 140 could be designed so that pleats extend generally perpendicular to internal edges 134, 144 and are not perpendicular to external edges 132, 142.

In order for portions 130, 140 to be asymmetrical portions, the pleats cannot be parallel to outermost edges 136, 146 and perpendicular to both external edges 132, 142 and internal edges 134, 144. In such a configuration, portion 130, 140 would not be tapered; that is, outermost edges 136, 146 and innermost edges 135, 145 would be the same length, which generally is not suitable for cylindrical or obround filter elements.

Pleat Depth, Pleat Density and Pleat Spacing

As a general rule, for cylindrical filter elements 100, each V-pack 120 present in element 100 will be the same as each other V-pack 120. That is, the pleat depth, pleat density and pleat spacing will be the same for each V-pack 120 in the filter element. Pleat depth, density and spacing will vary as a function of the media inner diameter (at inner perimeter 117), media outer diameter (at outer perimeter 116), air flow volume, and amount of contaminant in the air to be removed, as will the number of V-packs present. For oval or other obround filter elements, various V-packs, such as those at the ends, may be configured differently.

As stated above, the length of the pleats for V-portion 130, 140 (measured from edge 132, 142 to edge 134, 144) is greater at outermost edge 136, 146 than at innermost edge 135, 145. Typically, the pleat depth or length at outermost edge 136,146, as a ratio to the pleat depth or length at innermost edge 135, 145, is greater than 1:1 and is typically about 2:1. The ratio generally does not exceed 7:1, and in some embodiments does not exceed 5:1. Typically, the pleat depth change between edge 135, 145 and edge 136, 146 is linear, so that the average of the pleat depth at edge 135, 145 and the pleat depth at edge 136, 146 is representative of the average pleat depth for the V-portion 130, 140.

Also as stated above, V-portions 130, 140 are asymmetric portions. A central line drawn through the center of edge 136, 146 and extending to the center of edge 135, 145 would not create two equal sides or two mirror images. The pleat angle from the central line to edge 132, 142 differs from the angle measured from the central line to edge 134, 144. And, an axial line B drawn from the filter center C to the center of outermost edge 136, 146 does not create two equal sides or two mirror images. The average pleat depth from axial line B to edge 132, 142 would differ from the average pleat depth measured from axial line to edge 134, 144.

The variable pleat depth is desired for increasing the media surface area available. The area available, for the entire filter 100, can be estimated by multiplying the sum of the length of external edge 132, 142 and internal edge 134, 144 by the total number of media-Vs 120 present in element 100, by the length of media 110, extending from first end 102 to second end 104. Generally, very little, if any, exposed media area is present at outermost edge 136, 146 or innermost edge 135, 145, due to support structure 118a, 118b.

To minimize initial pressure loss and maximize filter life, a high pleat density is generally desired. For the following parameters provided below, when the term "pleat depth" is used, what is intended is the average pleat depth for the V-half; generally, the average pleat depth for V-portion 130, 140 will be the average of the pleat depth at outermost edge 136, 146 and at interior edge 135, 145.

At a 1 inch (about 2.5 cm) pleat depth, the optimal pleat density is about 10 to 12 pleats per inch (about 4 to 5 pleats per cm). At lower pleat depths, the preferred density increases to 15 pleats per inch (about 6 pleats per cm), and at larger pleat depths, this decreases to 8 pleats per inch (about 3 pleats per cm). The specific pleat depth and density will depend on the contaminant being removed and the media properties. The pleat densities provided above are particularly preferred for aircraft cabin applications that desire HEPA filter efficiency. For non-HEPA efficiencies, a pleat density of about 4 pleats per inch (about 1.5 pleats per cm) is suitable.

As seen in FIG. 9, a separation between the media of individual pleats is present. Uniform spacing of the pleats is desired to achieve effective use of the media. However, in order to achieve and maintain optimal pleat density, the pleat spacing must be controlled. Several mechanisms are known in the pleated media art to provide the pleat separation and spacing.

In at least one embodiment, the use of beads of hot melt adhesive, applied between the pleats during the pleating process, is the preferred pleat spacing technique. Other suitable techniques include a post beading operation where hot melt is applied over the pleat tips of a previously pleated element, embossing dimples onto the media, printing raised surfaces onto the media, and co-pleating with a web of nodes. The preferred distance between any means or technique used to maintain pleat spacing, such as hot melt beads, is no greater than 1.5 inches (about 3.8 cm). At spacings greater than about 1.5 inches (about 3.8 cm), the opportunity for the pleats to collapse increases. In some embodiments, it is preferred that the distance between any pleat spacing means or technique is no more than about 1 inch (about 2.5 cm).

Filter Media

All of V-packs 120 of filter element 100 may be folded from a single sheet or piece of media material, or, multiple pieces of media 110 may be used. For example, each V-pack 120 could be made from a piece of media; thus, pleats of portion 130 and pleats of portion 140 would be continuous. As another example, each section or portion 130, 140, could be made from a piece of media; thus pleat of portion 130 would not be continuous with pleats of portion 140. As yet another example, a portion 140 from V-pack 120a and a portion 130 from V-pack 120b could be made from a piece of media. Other arrangements, such as a piece of media being used to form two V-pleats (i.e., four halves or sections), are foreseeable.

Media 110 of filter element 100 is preferably HEPA media. HEPA filters are known in the art of filters as "high-efficiency particulate air" filters. HEPA media is the media of the filter that provides the filtration efficiency. Media 110 has a minimum efficiency of 99.97% removal when tested with essentially monodispersed 0.3 micron particles. Media 110 may be any suitable HEPA media and may be made from cellulose, polymeric materials (e.g., viscose, polypropylene, polycarbonate, etc.), glass or fiberglass, or natural materials (e.g., cotton). Other HEPA media materials are known. Microfibrous glass is a preferred material for HEPA media. Media 110 may be electrostatically treated and/or include one or more layers of material. One or more layers of fine fiber, such as taught by U.S. Pat. No. 6,673,136 (Gillingham et al.), may be included within media 110.

HEPA media is particularly desired for aircraft cabin applications because HEPA media is suitable for removing contaminants that could be harmful to people, such as bacteria and viruses. A preferred HEPA media for aircraft applications is commercially available from Lydall under the trade designation "Lydall 4450".

Media 110 may include an adsorbent material. Such a material may be included to provided adsorption or absorption of chemical contaminants, such as airborne acids, bases, and other volatile organic compounds (VOCs). Examples of acidic compounds that are often present in atmospheric air include sulfur oxides, nitrogen oxides, hydrogen sulfide, hydrogen chloride, and volatile organic acids and nonvolatile organic acids. Examples of basic compounds that are often present in atmospheric air include ammonia, amines, amides, sodium hydroxides, lithium hydroxides, potassium hydroxides, volatile organic bases and nonvolatile organic bases. The adsorbent material may be present on the surface of media 110 or throughout media 110.

Inlet and Outlet Angles

Minimizing the inlet and outlet half angles increases the amount of media that can be packaged into a given area. However, minimizing the inlet and outlet half angles also increases the V-channel pressure loss. What is meant by "V-channel pressure loss" is the pressure decrease of the filtered fluid that is attributable to the flow restriction created when the fluid flows through the channel formed by edge 132 and 142, as distinguished from the pressure decrease of the filtered fluid that is attributable to the flow restriction through the channels between the pleats or the pleated media itself.

Illustrated in FIG. 9 are first angle $\alpha 1$ and a second angle $\alpha 2$. First angle $\alpha 1$ is measured between external edge 132 or 142 and central axis A1; second angle $\alpha 2$ is measured between internal edge 134 or 144 and axis A2. When external edge 132, 142 is the inlet or upstream edge, angle $\alpha 1$ is the inlet half angle and angle $\alpha 2$ is the outlet half angle. When internal edge 134, 144 is the inlet or upstream edge, angle $\alpha 2$ is the inlet half angle and angle $\alpha 1$ is the outlet half angle. It has been determined that channel pressure losses increase non-linearly as the half angles $\alpha 1$ and $\alpha 2$ decrease. Therefore, there is an optimal set of half angles that will inhibit pressure loss while maintaining adequate filtration media area.

These specific values for half angles $\alpha 1$ and $\alpha 2$ are selected as a function of air flow rate, inner diameter of media 110 (generally defined by edges 135, 145) and outer diameter of media 110 (generally defined by edges 136, 146). Typical air flow rates for air through filter 100 range from 200 to 2000 ft$^3$/min (about 6 to 57 m$^3$/min), particularly for aircraft cabin applications. Typically, the inner diameter of media 110 for filter 100 is about 4 to 12 inches (10 to 30 cm), more typically about 6 to 9 inches (15 to 23 cm). Typically, the outer diameter of media 110 is about 6 to 24 inches (15 to 61 cm), more typically about 12 to 18 inches (30 to 46 cm).

An optimal combination of channel pressure loss and filter life is achieved when the combined channel inlet and outlet pressure losses are approximately 5 to 30% of the media pack losses, preferably 5 to 25%. By use of the term "media pack loss", what is meant is the pressure decrease due to passing through the pleat channels and the media material. Even more desired is when the combined channel inlet and outlet pressure losses are approximately 20% of the media pack losses.

To achieve the desired pressure loss levels, it is generally desired that the inlet half angle, whether first angle $\alpha 1$ for out-to-in flow or second angle $\alpha 2$ for reverse-flow (in-to-out), is about 2 to 13 degrees and that the outlet half angle is about 2 to 10 degrees. In more preferred embodiments, the inlet half angle is about 3 to 12 degrees and the outlet half angle is about 3 to 9 degrees. Depending on the contaminant to be removed, it may be desired to have a larger inlet half angle than outlet half angle. For example, indoor applications, which have large amounts of airborne lint and other fibrous materials, desire an inlet angle greater than the outlet angle. Typically, the difference between the inlet half and the outlet half angle is at least 2 degrees, preferably at least about 3 degrees. For aircraft applications, it is particularly desired to have a larger inlet half angle, as the large amounts of materials being filtered from the air could quickly occlude the inlet side surface.

In one particular, preferred embodiment, portions 130, 140 are arranged to have an inlet half angle $\alpha 1$ adjacent external side 132 of about 7.8 degrees and an outlet half angle $\alpha 2$ adjacent internal side 134 of about 4.4 degrees. The pleats extend generally perpendicular to external edge 132, 142.

Exemplary Sizes of Filter Elements

A circular filter element 100 typically has an outer diameter of about 6 to 26 inches (about 15 to 66 cm). In some embodiments, either or both end caps 112, 114 may have a diameter greater than the diameter of media 110 retained therein. A circular filter element 100 typically has an inner diameter of about 3.5 to 12 inches (about 9 to 20 cm). In some embodiments, either or both end caps 112, 114 may have a diameter less than the diameter of media 110 retained therein. Oval shaped or other similar obround shaped filter elements generally have similar dimensions. Whether circular, oval or other obround, filter element 100 typically has a length, from end cap 112 to end cap 114, of about 6 to 28 inches (about 15 to 71 cm). The specific shape and size of element 100 will depend on the intended application. For example, a DC-9 aircraft will receive a different shaped and sized filter 100 than a Boeing 767 aircraft.

Methods of Using Filter

Filter element 100 particularly suitable for use in applications where high unit area filtration, large air flow, low filter weight, or any combination of these features is desired. An example application is for aircraft applications, particularly the aircraft cabin. In use, air to be filtered is passed through media 110.

For standard, out-to-in, flow, the inlet side of filter media 110 is defined by outer perimeter 116, particularly by outermost edges 136, 146 and external edges 132, 142. The outlet side is defined by inner perimeter 117, particularly by innermost edges 135, 145 and internal edges 134, 144. The inlet angle is defined by $2 \times \alpha 1$ and the outlet angle is defined by $2 \times \alpha 2$. For high lint removal applications, such as interior applications, the inlet angle is greater than the outlet angle.

Air to be filtered enters filter element 100 at perimeter 116, particularly through media 110 at external edges 132, 142, passes through media 110 where contaminants are removed, and exits at perimeter 117, particularly through internal edges 134, 144.

For reverse, in-to-out, flow, the inlet side of filter media 110 is defined by inner perimeter 117, particularly by innermost edges 135, 145 and internal edges 134, 144. The outlet side is defined by outer perimeter 116, particularly by outermost edges 136, 146 and external edges 1324, 142. The inlet angle is defined by $2 \times \alpha 2$ and the outlet angle is defined by $2 \times \alpha 1$. For high lint removal applications, such as interior applications, the inlet angle is greater than the outlet angle.

Air to be filtered enters filter element 100 at perimeter 117, particularly through media 110 at internal edges 134, 144, passes through media 110 where contaminants are removed, and exits at perimeter 116, particularly through external edges 132, 142.

After sufficient use, such as when filter 100 becomes sufficiently occluded or unacceptable levels of pressure drop are encountered, filter 100 can be removed and replaced with another element 100.

It is to be understood, however, that even though numerous characteristics and advantages of the present invention have been set forth in the foregoing description, together with details of the structure and function of the invention, the disclosure is illustrative only, and changes may be made while remaining within the principles of the invention.

What is claimed:

1. A cylindrical air filter element comprising:
   (a) an extension of filter media configured and arranged in a plurality of media V-packs, each media V-pack having:
      (i) a first portion and a second portion, each of the first portion and the second portion having an external edge, an outermost edge, an internal edge and an innermost edge;
      (ii) the external edges of the first and second portions joined at an angle of about 4 to 26 degrees;
      (iii) the internal edges of the first and second portions joined at an angle of at least 4 degrees less than the external edge angle;
      (iv) the outermost edge of each portion being longer than the innermost edge of the respective s portion;
      (v) each of the first and second portions having a plurality of media pleats at a density extending generally parallel to the outermost edge of its respective portion; and
      (vi) a pleat spacing mechanism maintaining the pleat density;
   (b) the plurality of media V-packs configured to form a cylindrical arrangement.

2. The filter element of claim 1, wherein each of the plurality of media pleats extends generally perpendicular to the external edge of its respective portion.

3. The filter element of claim 1, wherein the plurality of media pleats extend generally at an angle of 2 to 13 degrees from perpendicular in respect to the internal edge of the respective portion.

4. The filter element of claim 1, wherein the pleat density is 8 to 15 pleats per inch.

5. The filter element of claim 1, wherein the pleat spacing mechanism are beads of hot melt adhesive spaced no more than 1.5 inches apart.

6. The filter element of claim 1, further comprising a first end cap and an opposite second end cap, the extension of pleated filter media extended between and potted within each of the end caps.

7. The filter element of claim 1, wherein the filter media comprises HEPA media.

8. A cylindrical air filter element comprising:
   (a) an extension of filter media configured and arranged in a plurality of media portions, each media portion having:
      (i) an external edge, an outermost edge, an internal edge and an innermost edge;
      (ii) the external edges of adjacent portions joined together at an angle;
      (iii) the internal edges of adjacent portions joined together at an angle of about 4 to 26 degrees, the angle being at least 4 degrees less than the angle of the external edges;
      (iv) the outermost edge being longer than the innermost edge;
      (v) the internal edges and innermost edges of the plurality of media portions defining an inner perimeter;
      (vi) the external edges and outermost edges of the plurality of media portions defining an outer perimeter;
      (vii) a plurality of pleats defined by the filter media extending generally parallel to the outermost edge;
   (b) the plurality of media portions configured to form a cylindrical arrangement.

9. The filter element of claim 8, wherein:
   (a) each of the plurality of pleats extends generally perpendicular to the external edge.

10. The filter element of claim 8, wherein:
    (a) the external edges of adjacent portions join together at an angle of about 6 to 24 degrees; and
    (b) the internal edges of adjacent portions join together at an angle of about 6 to 24 degrees;

11. The filter element of claim 8, wherein the plurality of pleats extends generally at an angle of 2 to 13 degrees from perpendicular in respect to the internal edge.

12. The filter element of claim 8, wherein the filter media comprises HEPA media.

13. A method of cleaning air for an aircraft cabin, comprising:
    (a) providing a filter element comprising:
       (i) an extension of filter media configured and arranged in a plurality of media portions, each media portion having:
          (A) an external edge, an outermost edge, an internal edge and an innermost edge;
          (B) the external edges of adjacent portions joined together at an inlet angle of about 4 to 26 degrees;
          (C) the internal edges of adjacent portions joined together at an outlet angle of about 4 to 26 degrees, the outlet angle being at least 4 degrees less than the inlet angle;
          (D) the outermost edge being longer than the innermost edge;
          (E) the internal edges and innermost edges of the plurality of media portions defining an inner perimeter;
          (F) the external edges and outermost edges of the plurality of media portions defining an outer perimeter;
          (G) a plurality of pleats defined by the filter media extending generally parallel to the outermost edge;
    (b) passing dirty air through the filter media from an inlet side of the filter media to an outlet side of the filter media; and
    (c) obtaining cleaned air.

14. The method of claim 13, wherein the step of providing a filter element comprises:
    (a) providing a filter element having the plurality of pleats extending generally perpendicular to the external edge.

15. The method of claim 13, wherein the step of providing a filter element comprises:
    (a) providing a filter element having the plurality of media portions configured to form a cylindrical arrangement.

16. The method of claim 13, wherein the step of providing a filter element comprises:
    (a) providing a filter element having the inlet side of the filter media defined by the outer perimeter and the outlet side defined by the inner perimeter.

17. The method of claim 15, wherein the step of providing a filter element having the inlet side of the filter media defined by the outer perimeter and the outlet side defined by the inner perimeter comprises:
(a) providing a filter element having the angle formed by the external edges of adjacent portions greater than the angle formed by the internal edges of adjacent portions.

18. The method of claim 13, wherein the step of providing a filter element comprises:
(a) providing a filter element comprising HEPA filter media.

* * * * *